United States Patent [19]
Ando et al.

[11] Patent Number: 5,717,641
[45] Date of Patent: Feb. 10, 1998

[54] METHOD OF STORING DATA AND A DATA STORING APPARATUS

[75] Inventors: Ichiro Ando, Yokosuka, Japan; Masato Matsuzawa, Berkshire, United Kingdom

[73] Assignee: Victor Company of Japan, Ltd., Yokohama, Japan

[21] Appl. No.: 689,109

[22] Filed: Jul. 30, 1996

[30] Foreign Application Priority Data

Jul. 31, 1995 [JP] Japan ................................ 7-215351

[51] Int. Cl.⁶ ........................... H04B 14/04; H04N 7/137
[52] U.S. Cl. ........................ 365/191; 365/198; 365/233; 365/239; 370/100.1; 370/102
[58] Field of Search ......................... 370/346, 410, 370/516, 100.1, 102; 365/191, 198, 233, 239

[56] References Cited

FOREIGN PATENT DOCUMENTS

| | | |
|---|---|---|
| 0633694 | 1/1995 | European Pat. Off. . |
| 0660612 | 6/1995 | European Pat. Off. . |
| 3-267846 | 11/1991 | Japan . |
| 7-221715 | 8/1995 | Japan . |
| 7-221716 | 8/1995 | Japan . |

OTHER PUBLICATIONS

Multimedia Computing and Networking 1995 (Proc. SPIE), vol. 2417, 6 Feb. 1995, San Jose, CA, USA, pp. 167–176, XP000575138, M. Baugher: "The OS/2 Resource Reservation System".

IEEE/ACM Transactions on Networking Over ATM Networks, vol. 3, No. 3, Jun. 1995, New York, USA, pp. 329–339, XP000510996, A.R. Reibman et al.: "Traffic Descriptors for VBR Video Teleconferencing Over ATM Networks".

Advanced Image and Video Communications and Storage Technologies (Proc. SPIE), vol. 2451, 20 Mar. 1995, Amsterdam, NL, pp. 297–309, XP002020044, F. Bernabei et al.: "MPEG over ATM issues: a scenario overview".

*Primary Examiner*—Viet Q. Nguyen
*Attorney, Agent, or Firm*—Pollock, Vande Sande & Priddy

[57] ABSTRACT

A method of storing data comprises the steps of: storing at least a set of coded real-time data having packets respectively having variable coding data rates per a predetermined interval in a data memory; detecting a maximum among the variable coding data rates; storing data of the maximum in a control data memory; selectively reading at least the see of coded real-time data in response to a demand; adding dummy data to read at least the set of coded real-time data such that the resultant data has a fixed data rate equal to or more than the data of maximum from the control data memory per the predetermined interval; and outputting the resultant data. A data storing apparatus embodying the method mentioned above is also disclosed. The data storing apparatus may further comprise a receiving circuit for receiving coded data output demanding data including a desired data rate and for supplying the desired data rate to the adding circuit. The adding circuit receives and uses the desired data rate as the fixed data rate.

3 Claims, 2 Drawing Sheets

METHOD OF STORING DATA AND A DATA STORING APPARATUS

BACKGROUND OF THE INVENTION

1. Field of the Invention

This invention relates to a method of storing data and a data storing apparatus.

2. Description of the Prior Art

A prior art method of storing data is known which comprises steps of storing a plurality of sets of real-time data including a moving picture and its accompanied sound data and selectively reading and outputting one of sets of real-time data as necessary.

For example, the video server in the VIDEO-ON-DEMAND (VOD) system employs such a method.

The video server in the VOD system, in response to a demand from a terminal coupled to the video server, reads a set of real-time data stored in a memory and transmits it to the terminal.

The terminal reproduces the set of the received real-time data and outputs it on a display monitor and a speaker.

Generally, an amount of the real-time data including data of moving pictures and the accompanied sound data is extremely large.

Therefore, the real-time data is compression-coded and stored in a memory and then, the coded data is transmitted to a terminal. The terminal decodes the compression-coded real-time data and reproduces the real-time data.

The compression-coding reduces the redundancy of a moving picture in the spatial directions and in the time base and redundancy of a sound signal in time base.

That is, a moving picture signal is subjected to a combination of the motion compensated predictive coding and orthogonal conversion coding to reduce the redundancy. The sound signal is subjected to the prediction coding, for example, to reduce the redundancy.

In the compression coding, the redundancy varies in accordance with a complexity of an image of a moving picture or a tone of a sound and degrees of variations of the image and the sound.

Therefore, if the real-time data compression-coded is transmitted to a transmission line having a fixed transmission data rate, it is necessary to make the coding data rate equal to the transmission rate of the transmission line.

Therefore, a portion of the compression-coded real-time data having the possibility that a coding data rate is higher than the transmission data rate, due to low redundancy, is made to have a higher coding data rate by, for example adding dummy data. Thus, the coding data rate is made constant, so that the real-time data compression-coded can be transmitted through the transmission line having a fixed transmission data rate.

SUMMARY OF THE INVENTION

The aim of the present invention is to provide an improved method of storing data and an improved data storing apparatus.

According to the invention, a method of storing data is provided which comprises the steps of: storing at least a set of coded real-time data having packets respectively having variable coding data rates per a predetermined interval in a data memory; detecting a maximum among the variable coding data rates; storing data of the maximum data rate in a control data memory; selectively reading at least the set of coded real-time data in response to a demand; adding dummy data to read at least the set of coded real-time data such that the resultant has a fixed data rate equal to or more than the data maximum rate from the control data memory per the predetermined interval; and outputting the resultant data.

According to this invention, a data storing apparatus is provided which comprises: a data memory for storing at least a set of coded real-time data having packets respectively having variable coding data rates per a predetermined interval; a detecting portion for detecting a maximum among the variable coding data rates; a control data memory for storing the maximum rate; a reading circuit for selectively reading at least the set of coded real-time data in response to a demand; and a dummy data adding circuit for adding dummy data to read at least the set of coded real-time data such that the resultant data has a fixed data rate equal to or more than the maximum data rate from the control data memory per the predetermined interval and for outputting the resultant data.

The data storing apparatus may further comprise: a receiving circuit for receiving coded data output demanding data including a desired data rate and for supplying the desired data rate to the dummy data adding circuit. The dummy data adding circuit receives and uses the desired data rate as the fixed data rate.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
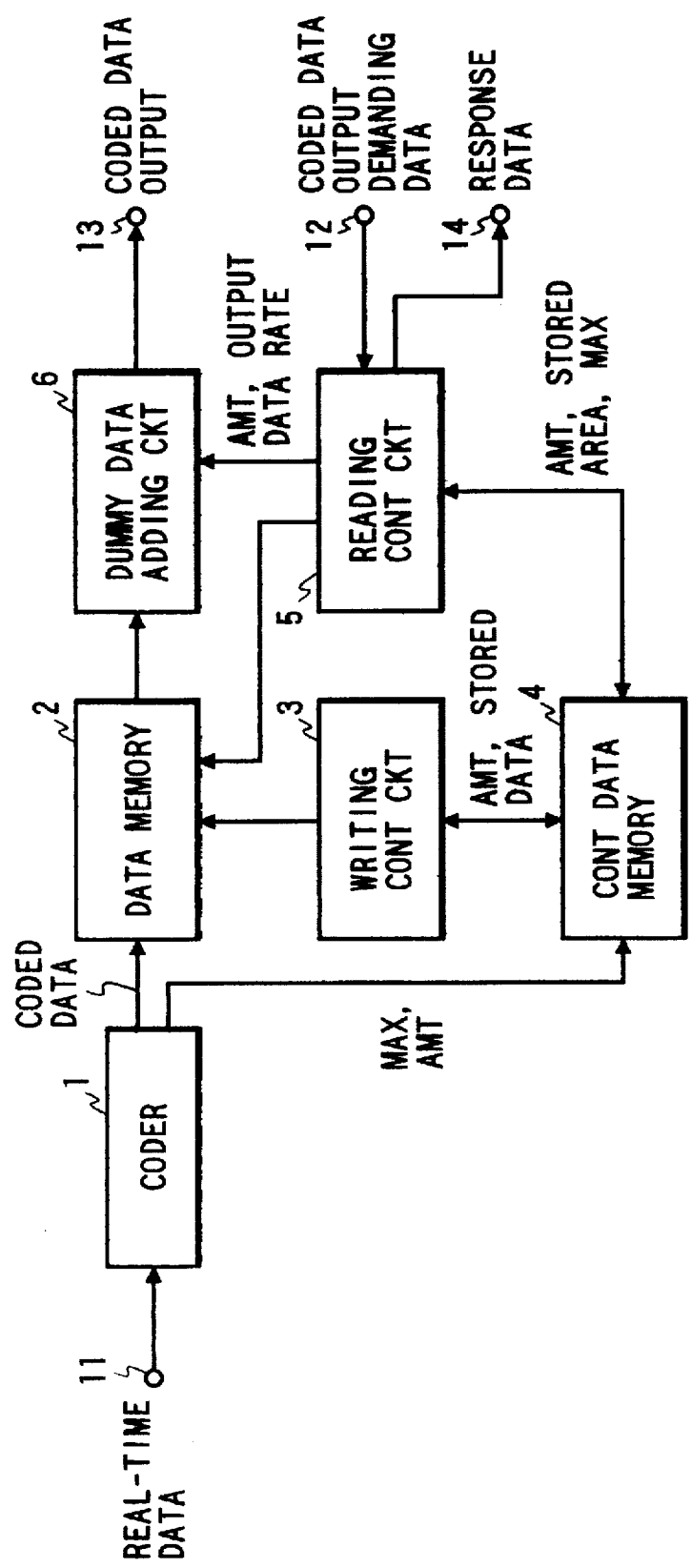
FIG. 1 is a block diagram of a data storing apparatus of an embodiment.

FIG. 1 is a block diagram of a data storing apparatus of this embodiment.

Real-time data, such as a moving picture video data and a sound signal, is supplied to a coder 1 through an input terminal 11. The coder 1 codes the real-time data with its coding data rate varied such that a train of the coded data is sectioned into packets and supplies the coded data to a data memory 2. The coder 1 also detects amount of coded data in each packet, and a maximum of amounts of coded data in a packet among a series of comprising, a program of the real-time data, and supplied the amount of data of the respective packets, and the maximum amount of data to a control data memory 4.

The coded data among a series of packets, that is, a program of the real-time data, and supplies data of amount of The amount of data of the packets is supplied to a writing control circuit 3 via the control data memory 4. The writing control circuit 3 stores the coded data in the data memory 2, generates data of stored area of the data memory 2, and stores the data of stored area of the data memory 2 in the control data memory 4. The maximum amount of the coded data in a packet is stored in the control data memory 4 to also control the addition of dummy data.

The coded data is selectively read, that is, for example, a program of coded data is selected and read, under control by a reading control circuit 5 in response to coded demanding data received through a terminal 12 from a terminal (not shown). The terminal is coupled to this data storing apparatus through a transmission line (not shown) for example. The read coded data is supplied to a dummy data adding circuit 6. The dummy data adding circuit 6 outputs the coded data at a terminal 13 with dummy data added as necessary.

The reading control circuit 5 controls reading the data memory 2 in response to the coded demand data using the data of the stored area in the control data memory 2 and controls the dummy data adding circuit 6 with reference to the maximum of amount of data in a packet of a series (a program) of packets.

As mentioned, the writing control circuit 3 communicates with the control data memory 2 and control data memory 4. The reading control circuit 5 also communicates with the control data memory 2.

The coder 1 affects the compression-coding to the inputted real-time data including video data of a moving picture and the accompanied sound data. The video data is coded through a combination of a motion compensation prediction coding and an orthogonal conversion coding, and the sound data is coded by a prediction coding for example. Other compression coding methods can be used also.

The video data and the sound data are coded at a coding rate equal to or less than an upper limit coding rate. That is, there is a possibility that the coding data rate of the video data and the sound data occasionally exceeds the upper limit coding data rate. Therefore, the coding data rate is controlled to be lower than the upper limit coding data rate. That is, during coding, quantizing prediction errors are made coarse. However, a portion having the coding data rate of the video data and the sound data lower than the upper limit coding data rate is outputted as it is, without the addition of the dummy data.

Figure 2A:
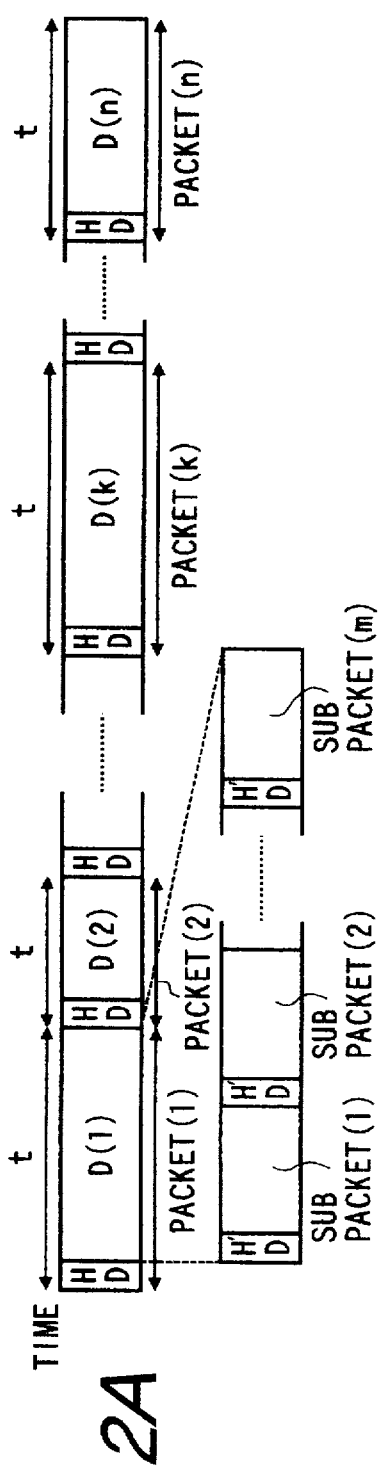
FIG. 2A is an illustration of this embodiment showing the coded data outputted from the coder shown in FIG. 1.

FIG. 2A is an illustration of this embodiment showing the coded data outputted from the coder 1.

The coded data is successively packetted (Packet (n)) by adding a header (HD) at every predetermined interval t.

Data D(n) of each of packets includes a plurality of sub-packets (m) having a fixed data length including identification data and data of efficient data length.

Since the complexity and degree of variation of a moving picture or the sound successively vary, the size of the packet generated at every predetermined interval t by the coder 1 varies.

The writing control circuit 3 successively writes the coded data from the coder 1 in the data memory 2.

The writing control circuit 3 manages the area to be written in accordance with the data of the used (stored) area of the data memory 2 which is stored in the control data memory 4 and renews data of the used (stored) area after or before writing data.

The coder 1 detects the maximum of data in a packet amount of a series of packets (n) during the coding and stores the maximum (Dmax) as a maximum data rate in the control data memory 4 after the coding.

Detecting the maximum amount of data (maximum coding data rate) can be omitted by storing the upper limit coding data rate in the control data memory 4.

The coded data stored in the data memory 2 is read when the demanding data (a) from the terminal 12 is detected and judged by the reading control circuit 5.

The demanding data (a) for coded data output includes selection data (a) for selecting one of sets of coded real-time data, i.e., a program of coded real-time data, in the data memory 2 and occasionally includes the desired output data rate (a2).

The reading control circuit 5 reads the maximum (Dmax) of the packets from the control data memory 4. Then, the reading control circuit 5 makes a decision as to whether or not there is the desired output data rate (a2) in the coded data output demanding data (a). If there is desired output data rate (a2), the reading control circuit 5 judges that outputting the coded data is possible and outputs response data indicative of the possibility of transmitting the coded data at a terminal 14.

If there is the data of output data rate (a2) in the coded data output demanding data (a), the reading control circuit 5 compares a maximum data rate corresponding to the maximum (Dmax) with the desired output data rate (a2).

If the desired output data rate (a2) is equal to or higher than the maximum data rate indicated by the maximum (Dmax), the reading control circuit 5 judges that it is possible to output the desired coded data and outputs data indicative of the possibility of transmitting the coded data at a terminal 14 as response data. If the desired output data rate (a2) is smaller than the maximum data rate indicated by the maximum data (Dmax), the reading control circuit 5 judges that it is impossible to output the desired coded data and outputs the response data indicative of impossibleness of transmitting the coded data at the terminal 14.

When the desired output data rate (a2) is not supplied to the reading control circuit 5, the reading control circuit 5 outputs the maximum (Dmax) data rates as the output data rate. When the desired output data rate is equal to or higher than the maximum data rate, the reading control circuit 5 outputs of desired output data rate to the dummy data adding circuit 6 as the output data rate data.

The reading control circuit 5 successively reads the coded data stored in the data memory 2 in response to the coded data output demanding data in accordance with the data of stored area stored in the control data memory 4 and supplies it to the dummy data adding circuit 6.

The dummy data adding circuit 6 determines an amount of dummy data to be added from the amount of data of each of the packets from the control data memory 4, and the output data rate, and adds the dummy data to the coded data, and output the coded data with the dummy data added to have the output data rate.

That is, the dummy data adding circuit 6 adds dummy data to the coded data such that the coding rate per the predetermined interval t is made larger than a fixed data rate greater than the maximum coding data rate. The dummy data is added with an indication of the dummy data in the identification data of the fixed length sub packet.

Figure 2B:
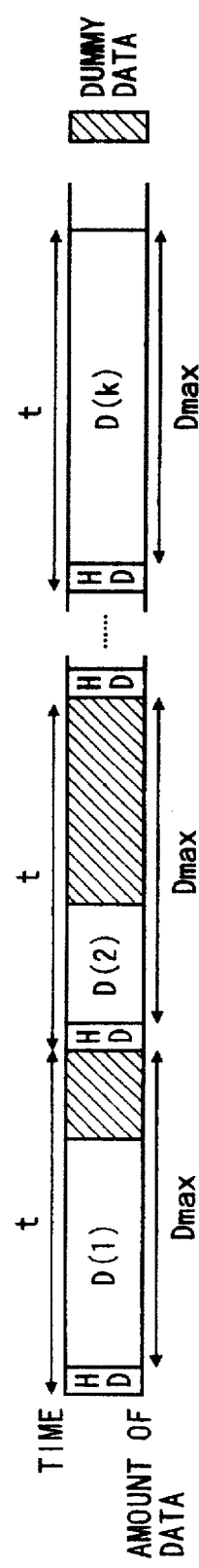
FIGS. 2B and 2C are illustrations of this embodiment showing data formats of the output of the dummy data adding circuit shown in FIG. 1.
Figure 2C:
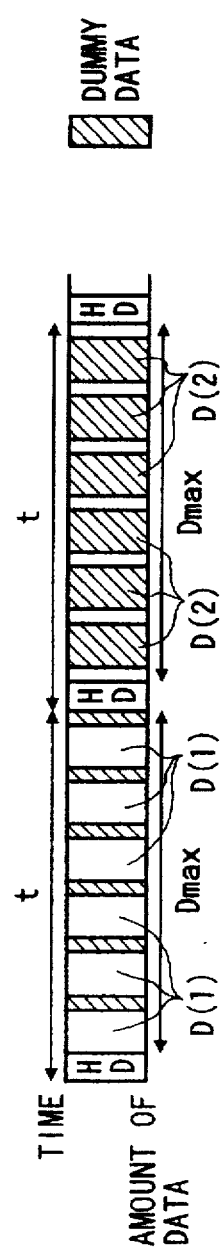

Adding the dummy data will be described more specifically. FIGS. 2B and 2C are illustrations of this embodiment showing data formats of the output of the dummy data adding circuit.

As shown in FIG. 2B, the dummy data is added to end portions of respective packets. On the other hand, the dummy data may be added between sub-packets as shown in FIG. 2C. In this case, the dummy data is added uniformly, so that decoding operation may be made favorably.

In this embodiment the data memory 2 and the control data memory 4 are independently provided. However, one memory can be used as these memories 2 and 4 with storing areas divided.

As mentioned above, the method of storing data is provided which comprises the steps of: storing (2) at least a set of coded real-time data having packets respectively having variable coding data rates per a predetermined interval in a data memory 2; detecting (1) a maximum rate among the variable coding data rates; storing the maximum rate in a control data memory 4; selectively reading (5) the set of coded real-time data in response to the demand (12); adding (6) the dummy data to the read set of coded real-time data such that the resultant data has a fixed data rate equal to or more than the maximum from the control data memory 4 per the predetermined interval; and outputting (13) the resultant data.

Moreover, the data storing apparatus embodying the method mentioned above is also provided which comprises the data memory 2 for storing at least a set of coded real-time data having packets respectively having variable coding data rates per the predetermined interval t, the detecting portion (coder 1) for detecting a maximum among the variable coding data rates, the control data memory 4 for storing data of the maximum; the reading control circuit 5 for selectively reading the set of coded real-time data in response to the demand (12), and a dummy data adding circuit (6) for adding dummy data to the read set of coded real-time data such that the resultant data has a fixed data rate equal to or more than the maximum rate from the control data memory 4 per the predetermined interval t, and for outputting the resultant data at the terminal 13. The data storing apparatus may receive the desired output data rate in the coded data output for the demanded data and supplies the data of desired output data rate to the dummy data adding circuit 6. The dummy data adding circuit 6 receives and uses the desired data rate as the fixed data rate.

As mentioned, in the data storing apparatus according this invention, at least a series of the coded real-time data having a variable data rate per the predetermined interval t is stored in the data memory and subject to the addition of the dummy data to provide a fixed output data rate throughout the series of real-time data after selectively reading the coded real-timed data, so that the capacity of the data memory 2 is saved because the dummy data is not stored in the data memory.

What is claimed is:

1. A method of storing data comprising the steps of:

coding real-time data at a variable coding rate which is equal to or less than a maximum data rate so that input data which occurs at a rate which is less than said maximum data is encoded at its input rate, and input data which occurs at a rate greater than said maximum rate is encoded at said maximum rate;

storing at least a set of said coded real-time data having packets with variable coding data rates in a data memory;

detecting said maximum data rate among said variable coding data rates;

storing said maximum data rate in a control data memory;

selectively reading at least said set of coded real-time data in response to a demand at a data rate specified in said demand, or when no rate is specified, at said maximum data rate adding dummy data to at least said read set of coded real-time data to provide resultant data having a fixed data rate equal to or more than said maximum data rate from said control data memory; and outputting the resultant data.

2. A data storing apparatus comprising:

a coder for coding real-time dam into real-time data packets at a variable coding rate equal to or less than a maximum coding data rate so that said real-time data which occurs at a rate which is lower than said maximum data rate is coded at said real-time data rate, and said real-time data which has a data rate greater than said maximum data rate is encoded at said maximum data rate;

data storing means for storing at least a set of said coded real-time data having packets with variable coding data rates per a predetermined interval;

detecting means for detecting said maximum data rate among said variable coding data rates;

control data storing means for storing said maximum data rate;

reading means for selectively reading at least said set of coded real-time data in response to a demand at a data rate specified in said demand when said specified data rate is equal to or below a maximum data rate, and at said maximum data rate when said specified data rate is greater than said maximum data rate, and a data rate equal to said maximum data rate when said data demand does not specify a data rate; and adding means for adding dummy data to said at least said set of coded real-time data such that the resultant data has a fixed data rate equal to or more than said maximum data rate from said control data memory per said predetermined interval and for outputting the resultant data.

3. A data storing apparatus as claimed in claim 2, further comprising: receiving means for receiving coded data output demanding data including a desired data rate and for supplying said desired data rate to said adding means, said adding means receiving and using said desired data rate as said fixed data rate.

* * * * *